United States Patent
Nonaka

(10) Patent No.: US 7,199,831 B2
(45) Date of Patent: Apr. 3, 2007

(54) EVALUATING THE EFFECT OF A STROBE LIGHT IN A CAMERA

(75) Inventor: Osamu Nonaka, Sagamihara (JP)

(73) Assignee: Olympus Corporation, Tokyo (JP)

( * ) Notice: Subject to any disclaimer, the term of this patent is extended or adjusted under 35 U.S.C. 154(b) by 765 days.

(21) Appl. No.: 10/304,613

(22) Filed: Nov. 26, 2002

(65) Prior Publication Data

US 2003/0103159 A1 Jun. 5, 2003

(30) Foreign Application Priority Data

Nov. 30, 2001 (JP) ............................ 2001-367604

(51) Int. Cl.
*H04N 5/222* (2006.01)
(52) U.S. Cl. ...................... 348/370; 348/371
(58) Field of Classification Search ...................... None
See application file for complete search history.

(56) References Cited

U.S. PATENT DOCUMENTS 6,822,690 B2 * 11/2004 Iida ............................ 348/364

FOREIGN PATENT DOCUMENTS

JP  2001-083563  3/2001

* cited by examiner

*Primary Examiner*—Ngoc-Yen Vu
(74) *Attorney, Agent, or Firm*—Straub & Pokotylo; John C. Pokotylo

(57) ABSTRACT

The effect of a shadow created on the background of a subject by emitted light from a strobe is suppressed. To accomplish this so, a shadow created by strobe light emission is detected and the shadow is eliminated. Alternately, the size of shadow created by strobe light emission is previously evaluated using the distance between the camera lens and strobe $X_0$, the distance to the subject $L_1$, and the distance to the background $L_2$ and a warning is given if necessary. This allows the elimination of the shadow created by strobe light emission or allows compositional arrangement change when a large shadow is expected due to strobe light emission. Therefore, undesired shadow due to strobe light emission is suppressed. Shadow suppression is particularly useful for photographs for photo IDs. It can be also applicable to corrections of some features on the picked up image caused by strobe light emission.

14 Claims, 9 Drawing Sheets

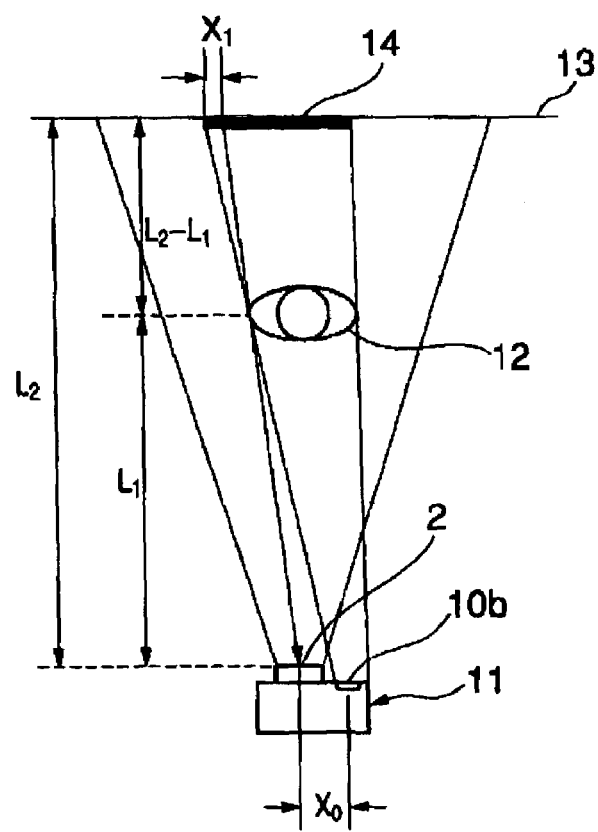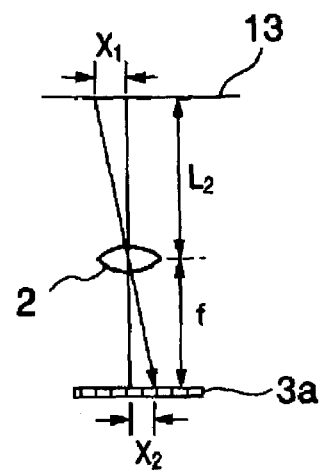
FIG. 6A
FIG. 6B

110 second strobe

EVALUATING THE EFFECT OF A STROBE LIGHT IN A CAMERA

CROSS-REFFERENCE TO RELATED APPLICATION

This application is based upon and claims the benefit of priority from the prior Japanese Patent Application No. 2001-367604, filed Nov. 30, 2001. The entire contents of the application are incorporated herein by reference.

BACKGROUND OF THE INVENTION

1. Field of the Invention

The present invention relates to a camera that can emit strobe light onto a subject and evaluate the effect of a strobe light in a camera.

2. Description of the Related Art

It is traditionally well-known to emit strobe light onto a subject as supplementary light during exposure in the dark or under a backlight condition. However, when the main subject has a wall in the background and strobe light is used, a shadow may appear on the wall or the like behind the main subject. Such a shadow may appear, for example, when a regular camera is used to take a photograph for photo IDs such as passports, and may be distracting.

The present invention is proposed in view of the above circumstances.

BRIEF SUMMARY OF THE INVENTION

The camera according to the present invention detects a shadow created by strobe light emission in the photographic image that is taken with a strobe light emission on the subject, and eliminates the shadow. Otherwise, the size of a shadow to be created by the strobe is calculated before taking a photograph with strobe light emission and a warning is given if necessary.

Thus, eliminating the shadow created by a strobe light emission from the photographic image, or changing the compositional arrangement to avoid the presence of a large shadow in the photographic image when the shadow is anticipated as a result of the strobe light emission, become possible. Consequently, an undesired shadow caused by a strobe light is suppressed. The present invention is particularly useful for taking a photograph for photo ID.

One of the methods for detecting a shadow created by a strobe light emission involves comparing an image obtained with a strobe light emission and an image obtained without a strobe light emission to detect a drop in light intensity due to the shadow.

One of the methods for estimating the size of a shadow created by a strobe light emission involves calculating the shadow area using the distance to the subject $L_1$, the distance to the background $L_2$, and the distance between the strobe and camera lens $X_0$.

Preferably, the distance to the background $L_2$ is examined and it is determined whether it is short enough for a strobe light to reach the background and make a shadow. If the distance $L_2$ is long enough such that the strobe light will not reach the background, the shadow elimination procedure should be omitted.

Preferably, the width of the shadow is evaluated and only a shadow wider than a predetermined width is eliminated.

One of the methods for eliminating a shadow involves replacing the shadow with image data surrounding the shadow. In this case, it is desired to display a warning and no replacement is done when image data surrounding the shadow are non-uniform.

One of the methods for eliminating a shadow involves the emission of another strobe light so that a shadow is not created.

The present invention can be applied to corrections of characteristic events in the images caused by strobe light emission besides the shadow elimination.

Preferably, the camera of the invention has a photographic mode in which a shadow created by strobe light emission is eliminated (for example, preferably photo ID mode) and other photographic mode in which the shadow is not eliminated, and switching can be done between them.

In the present invention, the strobe light includes a flash and other artificial supplementary light. The strobe can be built-in or auxiliary, and can emit light afar from the camera itself.

The camera according to the present invention is not confined to a digital camera and includes a film camera and a video camera as far as it is applicable to them. Furthermore, the camera can be built in electronic devices.

BRIEF DESCRIPTION OF THE SEVERAL VIEWS OF THE DRAWING

These and other features, aspects, and advantages of the apparatus and methods of the present invention will become better understood with regard to the following description appended claims, and accompanying drawings where:

FIG. 6A is an illustration to explain how a shadow appears when strobe light is used;

FIG. 6B is an illustration which shows how a shadow on a wall appears on an image pick-up element;

DETAILED DESCRIPTION OF THE INVENTION

A preferred embodiment of the present invention is described hereinafter with reference to the drawings.

Embodiment 1 of the present invention is described with reference to FIGS. 1 to 5.

Figure 1:
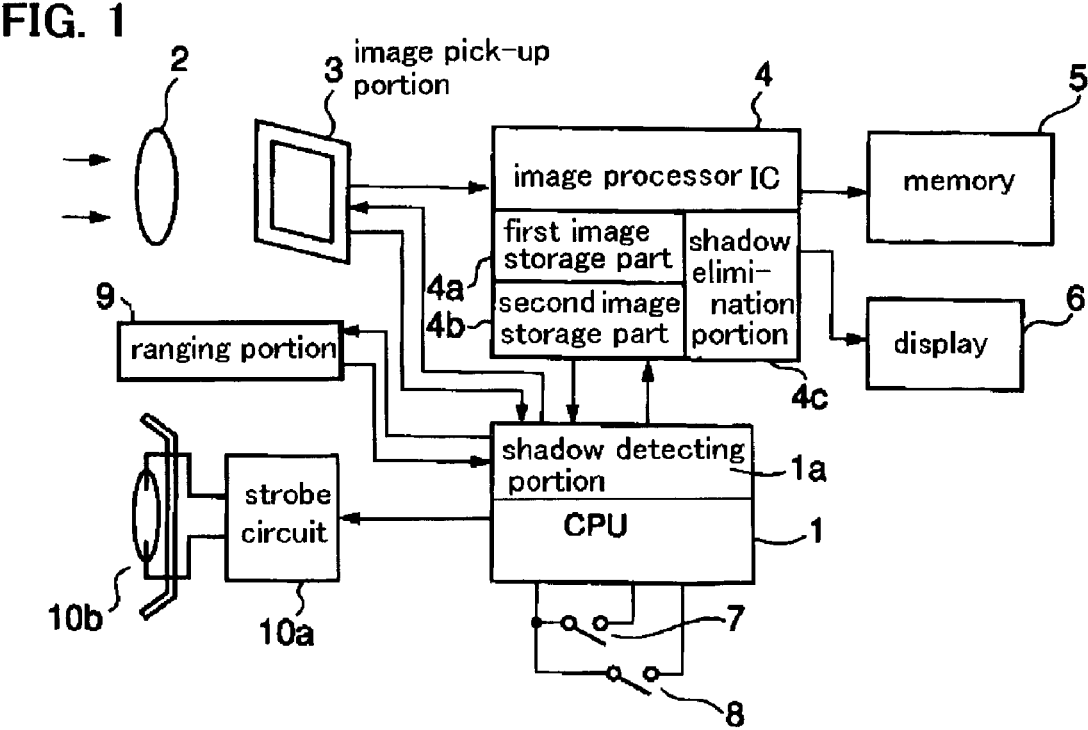
FIG. 1 is a block diagram which shows the structure of a camera according to Embodiment 1 of the present invention.

FIG. 1 is a block diagram which shows the structure of a camera according to Embodiment 1 of the present invention. It is assumed that the camera is a digital camera and has a function to eliminate a shadow created by strobe light emission onto a subject by digital image processing.

As shown in FIG. 1, a camera lens 2 is followed by an image pick-up portion 3 that is connected to an image processor IC 4, and the image processor IC 4 is connected to a CPU 1 that serves as both an operation circuit and a control circuit. A memory 5 and a display 6 are connected to the image processor IC 4. A ranging portion 9 and a strobe circuit 10a are connected to the CPU 1. A strobe light emission portion 10b is connected to the strobe circuit 10a. A release switch 7 and a mode change switch 8 are also connected to the CPU 1.

The CPU 1 controls the entire camera operation and various sequences for image processing performed in the image processor IC 4. The CPU 1 also functions as a shadow detecting portion 1a that detects the shadow created by a strobe light emission in the input image. The function of the shadow detecting portion 1a may be realized by a program that runs on the CPU 1 or a dedicated electronic circuit.

The camera lens 2 forms an image of the subject on the image pick-up portion 3 that is an image pick-up element such as a CCD. The image pick-up portion 3 transforms the subject image formed by the camera lens 2 into electric signals and integrates the electronic signals to provide them to the image processor IC 4 as subject image signals. The subject image signals are also provided to the shadow detecting portion 1a in the CPU 1.

The image processor IC 4 performs various image processes such as an image signal compression and a shadow elimination described later. The image processor IC 4 comprises a first image storage part 4a for storing an image that is captured without a strobe light emission, a second image storage part 4b for storing an image that is captured with a strobe light emission, and a shadow elimination portion 4c for eliminating the shadow detected by the shadow detecting portion 1a of the CPU 1.

The memory 5 is a storage comprising, for example, a nonvolatile semiconductor memory to store captured images.

The display 6 comprising, for example, a liquid crystal display to display captured images.

The release switch 7 is a switch to start the photographic operation. The mode change switch 8 is a switch to change a current operation mode of the camera from a normal mode to a photo ID mode for taking a photograph for photo IDs such as for a passport. The CPU 1 detects the states of the switches so as to allow photographic actions or mode changes.

The ranging portion 9 is used to measure the distance to the subject for focusing the camera lens 2. The strobe unit is used to emit strobe light onto the subject depending on photographic scenes and comprises a strobe circuit 10a and a strobe light emission portion 10b.

Figure 2:
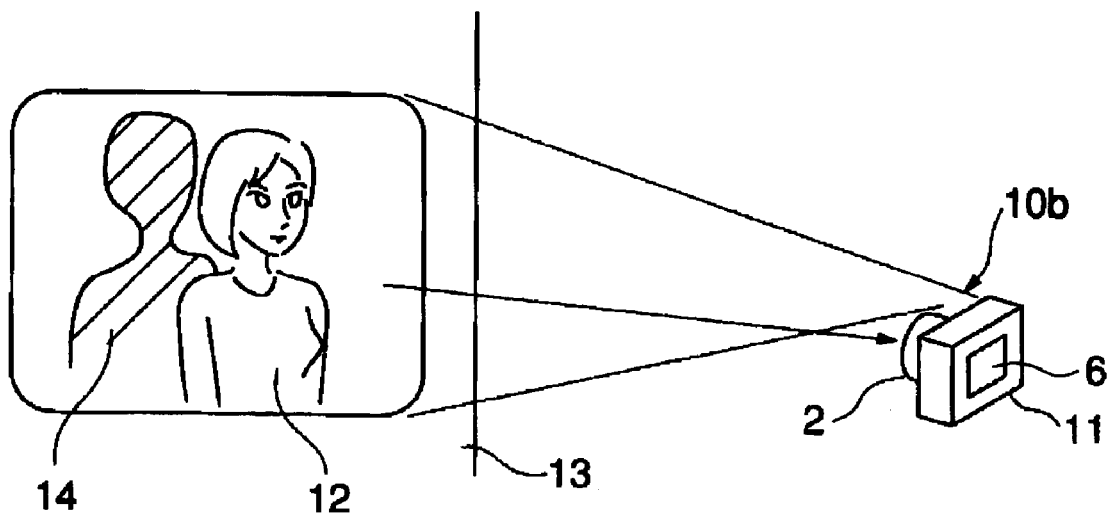
FIG. 2 is an illustration which shows an example of taking a photograph of a person with his/her back to a wall.

The operation of the camera having the structure above is described hereafter with reference to FIG. 2.

Figure 3B:
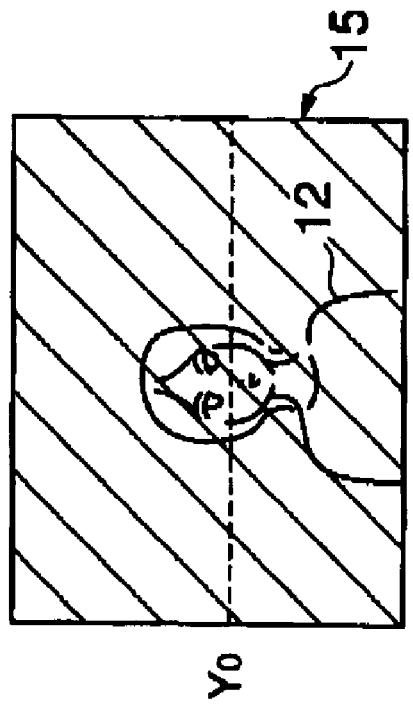
FIG. 3B is an illustration which shows a photographic image without strobe light.
Figure 3A:
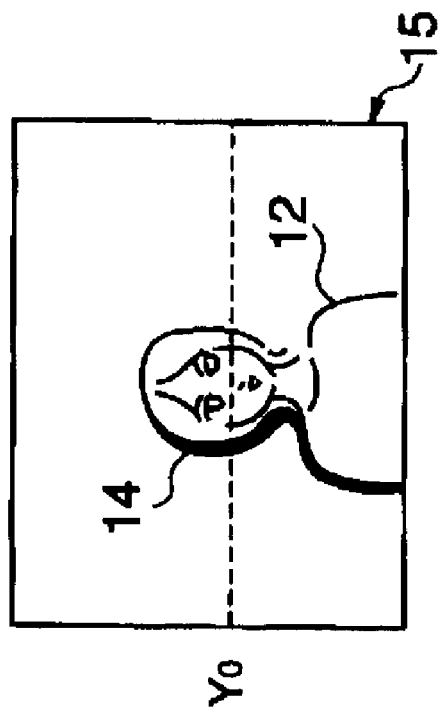
FIG. 3A is an illustration which shows a photographic image with strobe light.

When a camera 11 is used to take a photograph of a person 12 as a main subject with his/her back to a wall 13, the person 12 has a shadow 14 on the wall 13 created by strobe light from the strobe emission portion 10b. Consequently, the shadow 14 appears in a photograph image 15 that is taken through the camera lens 2, as shown in FIG. 3A. Strobe light emission occurs in an instant. Therefore, the user cannot recognize the shadow 14 being created before he/she views the image displayed on the display 6 following the photography.

Figure 4:
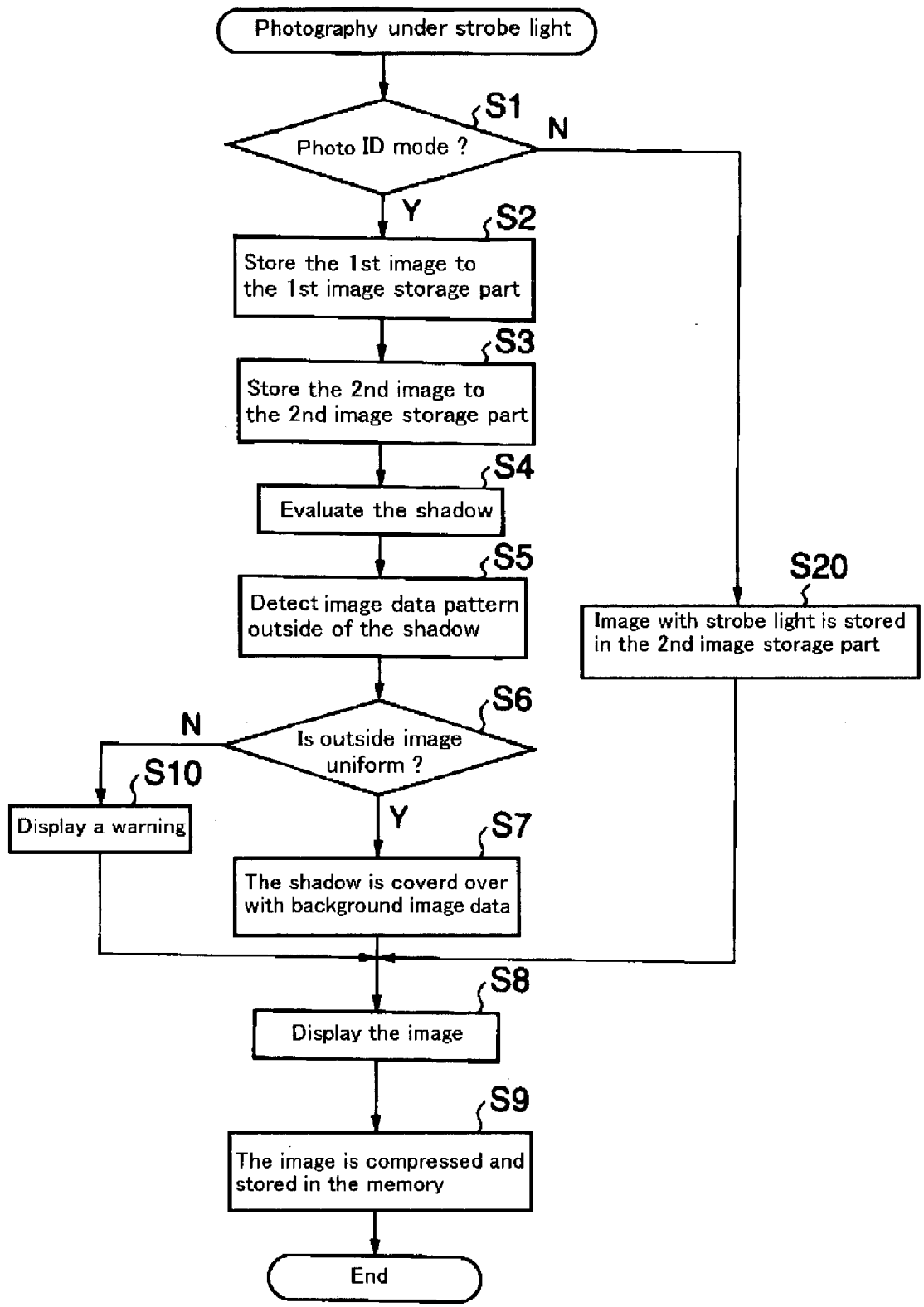
FIG. 4 is a flowchart to explain the operation of the camera according to Embodiment 1 of the present invention.

In Embodiment 1 of the present invention, the shadow created by the strobe light emission is automatically eliminated by executing the operation of the flowchart shown in FIG. 4. Here, the shadow elimination function of the camera according to this embodiment is utilized on the assumption that the background wall essentially has no pattern and is uniform. This assumption can be applied to photographs for photo IDs. In general, plain backgrounds (for example walls) are intentionally selected for photo IDs. The case for taking a photograph for photo IDs is explained next.

In the flowchart of FIG. 4, after the release switch 7 is turned on by the user to start the photography, the CPU 1 detects the state of the mode change switch 8 and determines whether the current operation mode is a photo ID mode for taking a photograph for photo IDs (Step S1). If it is not the photo ID mode, regular strobe photography is performed in which the CPU 1 allows strobe light emission onto the photographic subject and the captured digital image is stored in the second image storage part 4b (Step S20), then the CPU 1 proceeds to Step S8. As described, the mode change switch 8 is used to select a desired mode among the plural photographic operation modes and therefore it can be termed as a mode setting portion. The CPU 1, which detects the state of the mode change switch 8 and determines the current operation mode, can be termed as a mode determination portion. The mode determination portion can be realized by a program that runs on the CPU 1 or a specific electronic circuit for determining an operation mode.

Figure 5A:
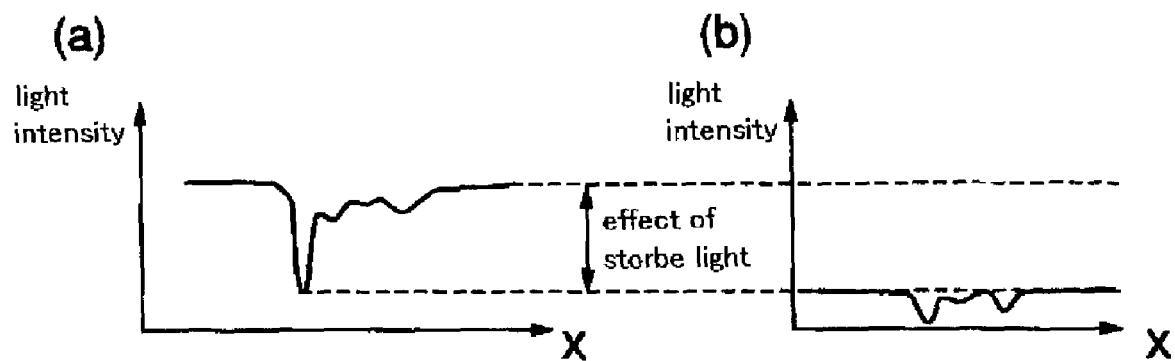
FIG. 5A is a graphic representation which shows light intensity profiles when strobe light is used (a) and unused (b) in a juxtaposed manner.

On the other hand, if the CPU 1 determines that the operation mode is the photo ID mode in step S1, a digital image data captured without a strobe light emission (first image) is stored in the first image storage part 4a of the image processor IC 4 (Step S2). The first image may be an underexposed image, as shown in FIG. 3B. This first image shows the pre-strobe light emission state and is used to evaluate a shadow, as described later. FIG. 5A (b) shows an image signal on the line $Y_0$ in the first image shown in FIG. 3B that is obtained by the image pick-up portion 3. In FIG. 5A, light intensity is plotted on the ordinate and horizontal position on the abscissa. In the case of (b), an image signal has relatively low light intensities throughout the horizontal positions and has more or less fluctuations in intensity at the position corresponding to a person 12.

Then, a photograph is taken using a strobe light emitted from the strobe light emission portion 10b and the captured digital image (second image) is stored in the second image storage part 4b of the image processor IC 4 (Step S3). With strobe light emission onto the subject, the second image may be a well-exposed image, as shown in FIG. 3A. However, the second image has a shadow 14 created by strobe light, as described above. FIG. 5A (a) shows image signals corresponding to the line $Y_0$ in FIG. 3A. As a whole, light intensities in the image increases in FIG. 5A (a) compared with FIG. 5A (b) because of the influence of the strobe light emission. Local low light intensities (a drop of intensity) are observed to the left of the person 12. This corresponds to the shadow created by the strobe light.

Next, the CPU 1 performs shadow evaluation at the shadow detecting portion 1a in which the first image in the first image storage part 4a of the image processor IC 4 is compared with the second image in the second image storage part 4b to detect the shadow position created by the strobe light emission (Step S4).

Figure 5B:
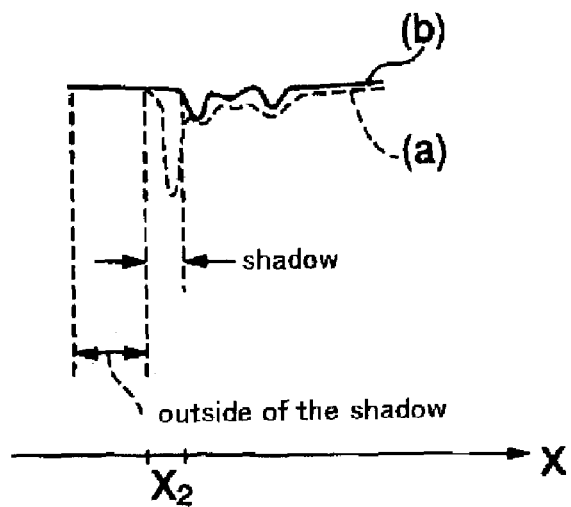
FIG. 5B is a graphic representation which shows light intensity profiles when strobe light is used (a) and unused (b) in an overlapped manner.

Shadow evaluation is described next. The first and second images are compared using respective image signals that are provided to the shadow detecting portion 1a from the image pick-up portion 3. The image signals of the second image shown in (a) of FIG. 5A have increased light intensities due to the strobe light emission compared to the image signals of the first image shown in (b) of FIG. 5A. Therefore, to compare the both signals, the influence of the strobe light emission is compensated and the amplitudes of the both signals are simply compared. FIG. 5B shows signal levels adjusted to have the same background light intensity for the comparison of waveforms of FIG. 5A (a) and (b). The comparison of the waveforms of (a) and (b) in FIG. 5B shows a drop in light intensity in the waveform of (a), which is not seen in the waveform of (b). The light intensity drop range $X_2$ corresponds to the shadow with high contrast created by the strobe light. Thus, detecting the range $X_2$ in FIG. 5B leads to the detection of the shadow position.

Shadow evaluation can be preformed for all the lines in the photographic image 15 or can be discontinued when the shadow-indicating features in the signal amplitude is no longer observed.

In Embodiment 1, the shadow area that is detected through the shadow evaluation above is covered over (has its data overwritten) with image data surrounding the shadow to eliminate it. In this case, when the background wall has patterns or uneven contrasts, it is required to determine which image data should be used to replace the shadow area among the image data outside the shadow area. This will complicate the apparatus structure. Therefore, Embodiment 1 omits shadow elimination when the background wall has a complex pattern, which corresponds to Steps S5 and S6. Thus, after the shadow position is found at Step S4, the CPU 1 detects the image data pattern outside the shadow area (Step S5). Such pattern detection is performed for a certain range that surrounds the shadow (outside the shadow in FIG. 5B). This pattern detection outside the shadow should be performed for all the lines along the X axis in the photograph image 15 of FIG. 3A to form the area consisting of image data outside the shadow.

An example of pattern evaluation is given hereafter. In FIG. 3A, the CPU 1 assumes that the area that has less fluctuation in brightness is background among the adjacent areas to the shadow and extracts it with the same width as the shadow along the X axis. As is apparent from FIG. 5A, this is based on the feature that the subject area has more fluctuation in brightness and the background has less fluctuation in brightness. Then, the CPU 1 determines whether the selected area is uniform pattern based on brightness. If the fluctuation in brightness of the area is within a predetermined range, it is assumed that the area essentially consists of a uniform pattern. If the fluctuation in brightness of the area is larger than the predetermined range, it is assumed that the area consists of a non-uniform pattern.

According to the pattern detection results, image data surrounding the shadows are found to be uniform or not (Step S6). For example, when image data in the selected area are all equal, the wall is assumed to be uniform. Instead of such a strict condition, the condition for a uniform pattern wall can be that 90% of the image data is equal. In this way, for example, if there is a stain on the wall, the background (outside image) can nonetheless be within an error range for shadow elimination. Pattern evaluation can be done on a line-by-line basis along the X axis, rather than on an area basis. The CPU 1 can be termed as a pattern evaluation portion, and determines whether image data surrounding the shadow in the photograph image consist of a nearly uniform pattern over a certain range. The CPU 1 can also be termed as a background image evaluation portion that evaluates image data in the background of the subject and determines whether the background image data are uniform. The pattern evaluation (background image evaluation) portion can be realized by a program that runs on the CPU 1, or a dedicated electronic circuit.

According to the evaluation results at Step S6, if the image data are uniform, the CPU 1 sends a command to the image processor IC 4 to replace the shadow area detected at Step S4 with the image data within the area described above (in other words, the shadow component is covered over (its data is overwritten) with the image data in the area described above) so as to eliminate the shadow by the shadow elimination component 4c (Step S7). Then, the image stored in the second image storage part 4b, after the shadow is eliminated, is displayed on the display 6 as a captured image (Step S8). Then, the displayed image may be compressed and stored in the memory 5 (Step S9) before the procedure ends.

If the background (outside) image data are determined to be non-uniform in Step S6, the CPU 1 displays a warning that the shadow elimination is not performed on the display 6 (Step S10) and does not perform a shadow elimination. Then CPU 1 proceeds to Step S8 where the captured image is displayed. Then, the displayed image may be compressed and stored in the memory 5 at Step S9 before the procedure ends.

In Embodiment 1, the shadow is covered over with the image data surrounding it to eliminate the shadow. However, the shadow elimination is not limited to this way. For example, the corresponding area of the shadow in an image data captured without strobe light emission may be cut out and pasted on the shadow area after the brightness is adjusted. Alternatively, plain image data having the same color and brightness as the area surrounding the shadow is created and pasted on the shadow. Alternatively, only the subject component in the image is slightly expanded in the horizontal direction to cover the shadow.

Besides shadow elimination, other image correction processes, such as lightening the shadow darkness, can be done. Procedures other than shadow processing can be done as well. For example, when a strobe light is emitted, the light intensity of a near subject increases and that of a distant subject does not. This makes the color of the near subject become whiter while that of the distant subject does not change. Such color tone change under the influence of strobe light emission can be corrected. In this way, the shadow elimination component 4c can be termed more broadly as an image correction portion when it performs image corrections not limited to the shadow elimination. The memory 5 in which a corrected image is stored can be termed as a corrected image storage portion.

As described above, Embodiment 1 enables, in the photo ID mode for taking photographs used for photo IDs such as passports, eliminating the shadow created by strobe light emission in the photograph picture. Furthermore, defects in the image caused by a strobe light emission can be corrected by comparing the images with and without the strobe light emission. Of course, the application of Embodiment 1 is not limited to photo IDs.

Figure 7A:
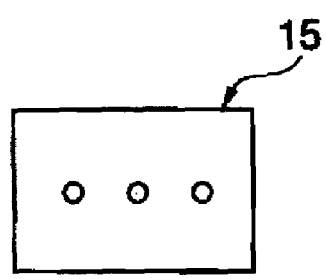
FIG. 7A is an illustration which shows that ranging measurements are taken for plural spots on a monitor.
Figure 7B:
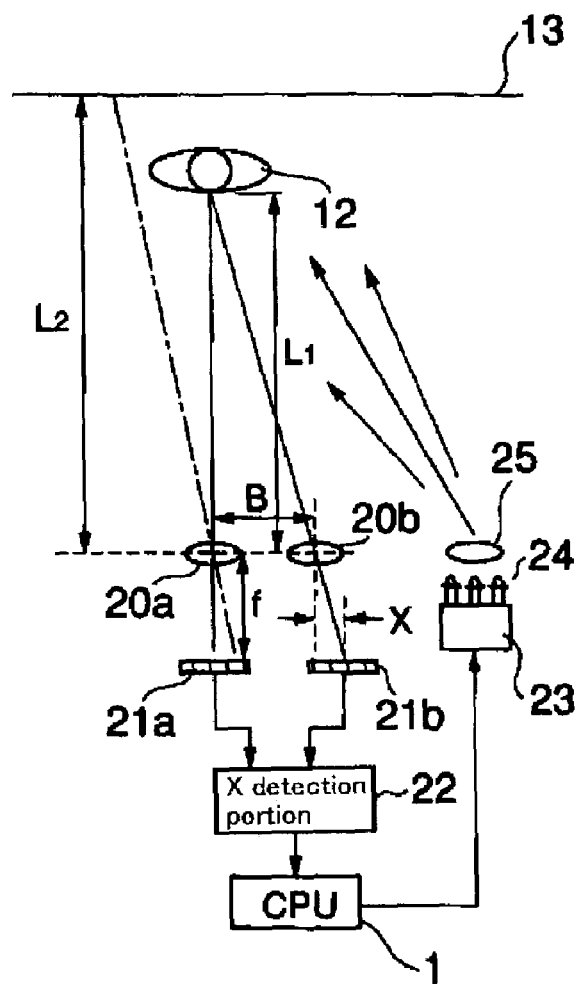
FIG. 7B is an illustration which shows the structure of Embodiment 2 of the present invention.
Figure 8:
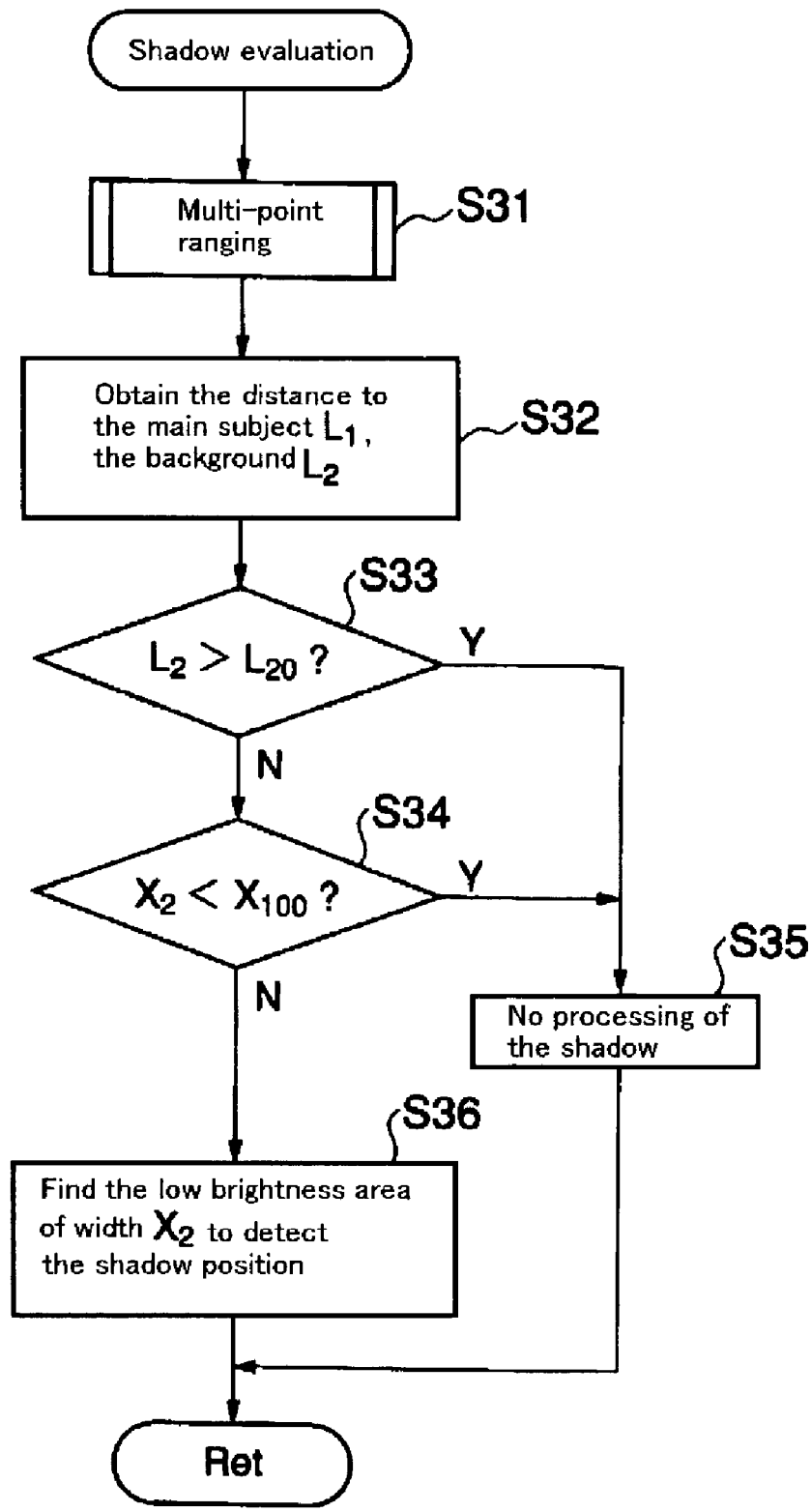
FIG. 8 is a flowchart to explain the operation of a camera according to Embodiment 2 of the present invention.

Embodiment 2 of the present invention is described hereafter with reference to FIGS. 6 to 8. Embodiment 2 is a modified version of the shadow evaluation of Embodiment 1. Therefore, the explanation is essentially directed to different portions.

FIG. 6A is an illustration which shows how a shadow appears in an image when a strobe light emission is used. A person 12, a subject, with his/her back to a wall 13 stands in front of the camera 11. A shadow 14 of the person 12 is created on the wall 13 by the light from the strobe light emission portion 10b. It is assumed that the distance between the camera 11 and person 12 is $L_1$ and the distance between the camera 11 and wall 13 is $L_2$.

If the camera lens 2 of the camera 11 is located apart from the strobe light emission portion 10b horizontally by $X_0$, the shadow 14 is created on the wall 13 by strobe light emitted on the person 12 that will be captured by the lens 2 will depend on the distance $X_0$. The shadow having a width of approximately $X_1$ defined by the expression 1 is photographed through the camera lens 2. The width $X_1$ leads to a width $X_2$ defined by the expression 2 which is the width of the shadow on the image plane 3a of the camera 12. The positional relationship between $X_1$ and $X_2$ is shown in FIG. 6B.

$$X_1 = X_0(L_1-L_2)/L_1 \tag{Expression 1}$$

$$X_2 = (f/L_2)X_1 \tag{Expression 2}$$

There are at least two possible ways for evaluating the effect of the shadow 14: using the measurement $X_1$ of Expression 1 and using the measurement $X_2$ of Expression 2. In the case $X_1$ is used for evaluating the effect of the shadow 14, when $L_1$ is substantially large so that L1 is almost equal to $L_2$ (that is to say the person 12 is in a distance), $X_1$ may be small enough to ignore effects of the shadow. However, if the camera 11 currently in use has a zoom function, the focal length f of the camera lens 2 can be changed according to the zoom operation. In this case, the influence of the focal length to the shadow captured on the image plane 3a becomes larger when the focal length becomes longer (independently of $X_1$). Accordingly, it is likely better to use $X_2$ for evaluating the effect of the shadow 14.

The effect of the shadow is further discussed in relation to Expression 2 in this embodiment, which can be applied to a camera having a zoom function. If a camera is without a zoom function, one expression selected from Expression 1 and Expression 2 can be applied.

The ranging portion 9 used in a camera according to Embodiment 2 is described next. The ranging portion 9 used in Embodiment 2 is supposed to be a multi-point ranging apparatus capable of taking measurements for plural points on the photograph area 15 (indicated by circles) as shown in FIG. 7A. The multi-points ranging apparatus has the structure shown in FIG. 7B.

Two sensor arrays 21a and 21b are provided at the focal points of the corresponding light receiving lens 20a and 20b that receive light from the subject. The sensor arrays 21a and 21b are connected to an X detection portion 22 which may be an electrical circuit for detecting the horizontal positional difference of the same subject between sensor array 21a and 21b and the X detection portion 22 is connected to the CPU 1. The CPU 1 is connected to a light emission circuit 23 having an LED 24. A light projection lens 25 is provided in front of the LED 24. In FIG. 7B, a person 12 with his/her back to a wall 13 stands in front of the multi-point ranging apparatus having the above structure.

The two light receiving lens 20a and 20b of the ranging apparatus are provided with a horizontal parallax B. The light receiving lens 20a and 20b monitor the person 12, a main subject, and form images from the subject on a pair of the sensor arrays 21a and 21b. The subject images that are formed on the two sensor arrays 21a and 21b are transformed into electric signals. The relative positional difference X between the two subject images that is caused by the parallax B is detected by the X detection portion 22 which is an electrical circuit for receiving outputs of the sensor arrays 21a and 21b and detecting the relative positional difference X between both images by comparing them. Here, the focal length of the light receiving lenses f, parallax B, relative positional difference X, and distance to the person 12 $L_1$ have the following relationship:

$$L_1 = Bf/X \tag{Expression 3}$$

and $L_1$ is calculated by the CPU 1.

The distance to the wall 13 $L_2$ can be obtained by replacing the person 12 with the wall 13, as shown in the broken line in FIG. 7B. In this embodiment, the wall 13 has uniform contrast. Therefore, the light emission circuit 23 is controlled to emit light from the LED 24 so that supplementary light is projected through the light projection lens 25 to provide contrast. The ranging process described above is performed on each of the multi-points of the photograph area as shown in FIG. 7A. The outputs from the parts of the sensor arrays corresponding to the multi-points are evaluated. The multi-point ranging apparatus described above is a well-known technique and therefore is not explained in detail.

FIG. 8 is a flowchart to explain the shadow evaluation of the camera according to Embodiment 2.

First, the ranging portion 9 performs the multi-point ranging (Step S31) to obtain the distance to the main subject $L_1$ and the distance to the background of the main subject $L_2$ (Step S32). Then, it is determined whether $L_2$ is larger than a certain distance $L_{20}$ or not (Step S33). $L_{20}$ is a threshold to determine whether the distance $L_2$ is within a range over which strobe light can reach. If $L_2$ is larger than $L_{20}$, the background is found to be too far and no shadow can be created for the main subject, and the shadow evaluation ends (step S35) and returns.

In Step S33, if $L_2$ is not larger than $L_{20}$, it is determined whether $X_2$ of Expression 2 is less than a certain value $X_{100}$ (Step S34). $X_{100}$ is a threshold to evaluate the width $X_2$ of the shadow on the sensor arrays. If the width $X_2$ of the shadow is smaller than $X_{100}$, the shadow does not have a width that requires the shadow processing. Thus, the shadow evaluation ends and returns (Step 35).

If $L_2$ is not larger than $L_{20}$ at Step S33 and $X_2$ is larger than a certain value $X_{100}$ in Step S34, it is determined that the shadow is present and has a substantial width: therefore, the shadow position is detected (Step S36). In the shadow position detection, a low brightness area is found in image signals captured by the image pick-up portion 3 as described in Embodiment 1. Here, it is known that a shadow is present and has a substantial width $X_2$ on the image plane 3a from the results of Steps S33 and S34 as described above. Thus, the low brightness area over the range of $X_2$ in obtained from the image signals can be assumed as the shadow.

In this way, Embodiment 2 calculates the range $X_2$ of the shadow on the sensor arrays. This eliminates comparison between images obtained with and without a strobe light emission. Only images obtained with a strobe light emission must be used to find low brightness areas having a width of the range $X_2$, facilitating the detection of the shadow area. Thus, there is no need to store an image prior to strobe light emission and, therefore, no need of storage for it. Processes other than shadow evaluation can be the same as in Embodiment 1.

As is described above, Embodiment 2 performs the shadow evaluation by measuring the distance to the subject. Shadow evaluation can be done without providing storage for storing image signals in the image processor IC. The shadow evaluation of Embodiment 2 can be combined with the shadow evaluation of Embodiment 1. This allows a double shadow evaluation, improving the precision of the shadow evaluation.

Figure 9:
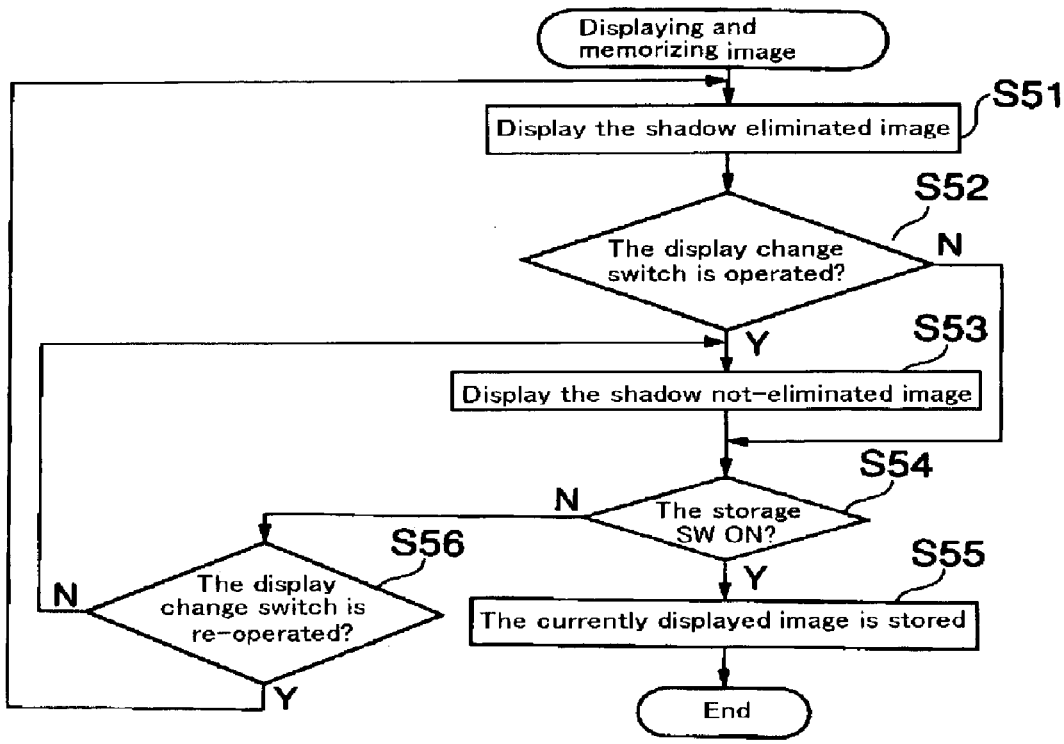
FIG. 9 is a flowchart to explain the operation of the camera according to Embodiment 3 of the present invention.

Embodiment 3 of the present invention is described hereafter with reference to FIG. 9. In Embodiment 1, when the background image data surrounding the shadow are non-uniform, a warning that the shadow elimination procedure is not performed is displayed and then an image with the strobe emission without the shadow elimination is stored in the memory 5 and displayed on the display 6. In Embodiment 3, even when the background image data surrounding the shadow are non-uniform, the shadow elimination is performed and a preferred image is selected by the user between the images with and without the shadow. In addition to the structure of Embodiment 1, Embodiment 3 further comprises a display change switch (not shown) for switching the displayed image between the images with and without shadows on the display 6 and a storage switch (not shown) that is operated by the user to determine whether the displayed image is stored in the memory 5.

FIG. 9 is a flowchart to explain the display and storage of the image when the shadow evaluation is unreliable (such as in the case of non-uniform background data) in Embodiment 3.

The shadow is evaluated according to the procedure in Embodiment 1 or 2. Then, the background image (wall) pattern is evaluated. When the background image pattern is determined to be non-uniform, a warning is displayed and then the shadow is eliminated. The shadow-eliminated image is displayed on the display 6 (Step 51). The user views the shadow-eliminated image and determines whether the shadow-eliminated image is stored in the memory 5. The display change switch, which is to select a displayed image from the shadow eliminated image and the shadow not-eliminated image, it is operated to change the image to another one (the image in which the shadow in not eliminated). The CPU 1 detects the state of the display change switch and determines whether the shadow-eliminated image remains displayed or not (Step 52). If the display change switch remains in the shadow-eliminated state, and the process proceeds to Step S54. If the display change switch is switched to the shadow not-eliminated state, the image with a shadow is displayed on the display 6 (Step S53) and the process proceeds to Step S54. In Step S54, the state of the storage switch is detected. If the storage switch is turned on, the currently displayed image may be compressed and stored in the memory 5 (Step S55) and the procedure ends. On the other hand, if the storage switch remains off, a determination is made as to whether the display change switch is re-operated (Step S56). If the display change switch is re-operated, the process returns to Step S51. If the display change switch is not re-operated, it returns to Step S53.

As described above, Embodiment 3 allows the user to view and compare the images before and after the shadow elimination so as to select and store a preferred image in the memory.

Figure 10:
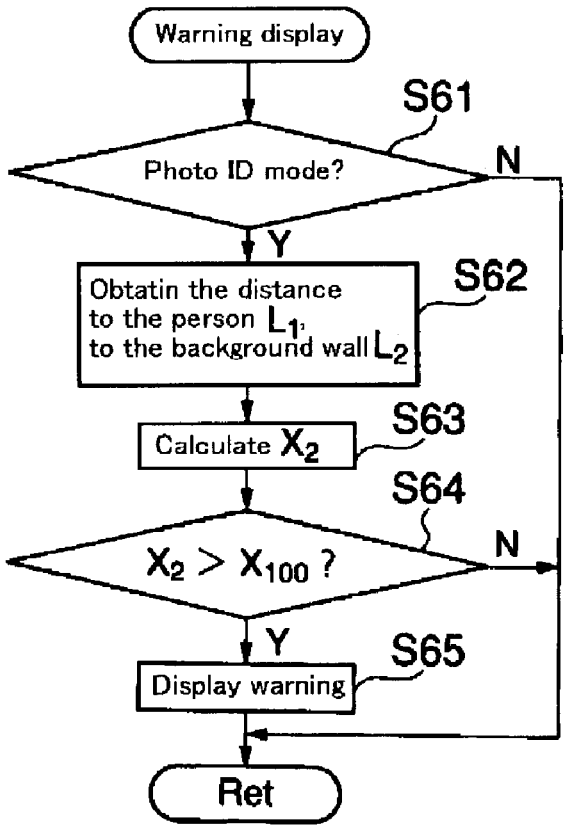
FIG. 10 is a flowchart to explain the operation of the camera according to Embodiment 4 of the present invention.

Embodiment 4 of the present invention is described hereafter, with reference to FIG. 10. The camera of Embodiment 4 is a modified version of Embodiment 2 and not necessarily a digital camera.

FIG. 10 is a flowchart to explain the operation of the camera according to Embodiment 4 of the present invention.

This embodiment performs the shadow evaluation based on the distance to a subject as in Embodiment 2. However, a possible shadow appearance is evaluated before photography and a warning is displayed when the shadow appearance is anticipated. First, for example, when the release switch 7 is pushed half way (first release ON), the CPU detects the state of the mode change switch 8 to determine whether the current operation mode is the photo ID mode for taking a photograph for photo IDs (Step S61). If it is not the photo ID mode, the process leaves the flowchart to perform regular strobe photography. If it is in the photo ID mode, the distance between the camera 11 and person 12 ($L_1$) and the distance between the camera 11 and wall 13 ($L_2$) are obtained (Step S62). After the distances $L_1$ and $L_2$ are obtained, $X_2$ described above is calculated using Expressions 1 and 2 above (Step S63). Then, a determination is made as to whether the obtained $X_2$ is larger than a predetermined value $X_{100}$ or not (Step S64). If it is not larger than the predetermined value $X_{100}$, the procedure ends. If it is larger than the predetermined value $X_{100}$, a message that a shadow may appear in the photograph monitor is displayed on the display 6 (Step S65) and the procedure ends. When the release switch 7 is further operated and fully pushed after this procedure (second release ON), an image without shadow elimination is captured.

As described above, Embodiment 4 omits the function to eliminate shadows created by strobe light emission and displays a warning when a possible shadow appearance is detected.

Figure 11:
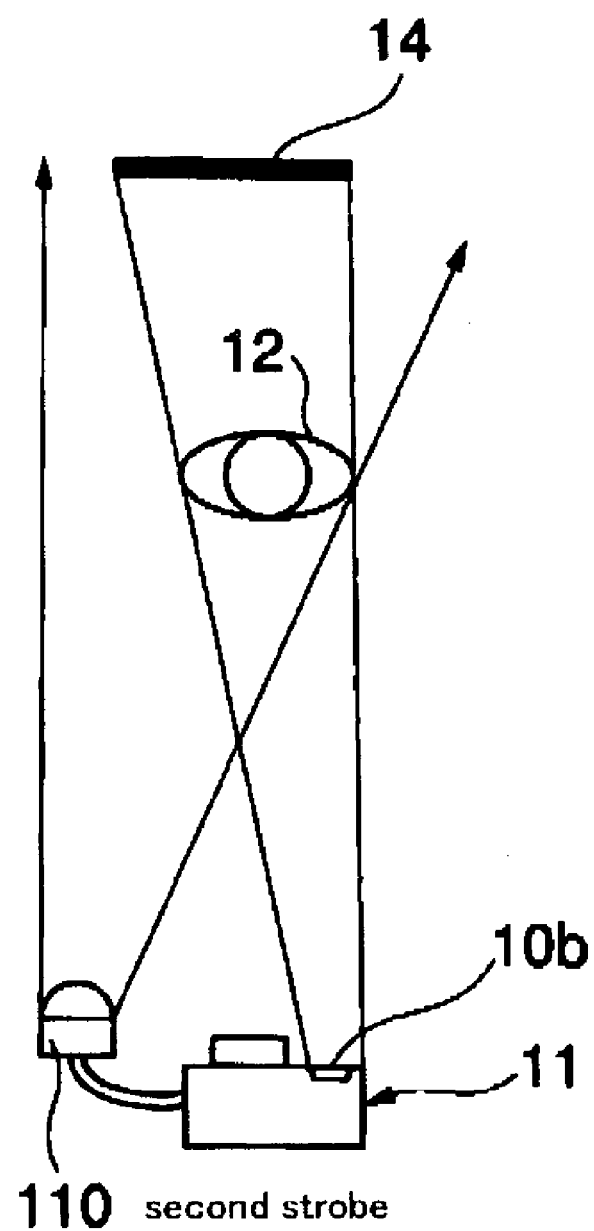
FIG. 11 is an illustration which shows a modified method for eliminating a shadow.

Therefore, Embodiment 4 can be applied to non-digital cameras. The displayed warning urges the user to change compositional arrangement or distance so that shadows can be avoided. Furthermore, a second strobe 110 connected to the camera 11 as shown in FIG. 11 can be used to avoid the shadow 14.

The present invention is described above with reference to embodiments. However, the present invention is not confined to the embodiments described above and various modifications and applications are available within the scope of the present invention.

As described above in detail, the present invention prevents the shadow from being created when strobe light is emitted onto the subject so that more natural and beautiful images can be obtained through a simple operation.

Photographs obtained this way are suitable for photo IDs such as passports.

While there has been shown and described what is considered to be preferred embodiments of the present invention, it is, of course, understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A camera comprising:
   a strobe apparatus for emitting illumination light onto a subject;

an image pick-up portion for transforming an image of the subject into electric signals and outputting the subject image signals;

a shadow detecting portion for detecting a presence of a shadow, by comparing (1) a first image data output of the subject obtained by the image pick-up portion in an image picking up procedure without light emission of the strobe apparatus onto the subject and (2) a second image data output of the subject obtained by the image pick-up portion in an image picking up procedure with light emission of the strobe apparatus onto the subject, created in the picked up image of the second image data when the strobe apparatus emits light onto the subject;

a shadow eliminating portion for eliminating the shadow created in the picked up image of the second image data when the shadow detecting portion detects the presence of the shadow; and a pattern evaluation portion for evaluating the image patterns adjacent to the shadow in the picked up image and determining whether the image patterns are nearly uniform over a predetermined region, wherein the shadow eliminating portion eliminates the shadow by replacing image data of the shadow with image data adjacent to the shadow when the image patterns adjacent to the shadow on the picked up image are determined to be nearly uniform over the predetermined region.

2. The camera according to claim 1, further comprising:
a mode setting portion for selecting and setting a desired mode through operations among plural photographic modes including a photo ID mode for taking a photograph for a photo ID; and
a control portion for operating the shadow detecting portion and the shadow eliminating portion at least when the photo ID mode is selected.

3. A camera comprising:
a strobe apparatus for emitting illumination light onto a subject;
an image pick-up portion for transforming an image of the subject into electric signals and outputting the subject image signals;
a first image storage for storing a first image data of the subject obtained by the image pick-up portion in an image pick up procedure without light emission onto the subject by the strobe apparatus in response to the start of photographing;
a second image storage for storing a second image data of the subject obtained by the image pick-up portion in an image pick up procedure with light emission onto the subject by the strobe apparatus in response to the start of photographing;
an image correction determination portion for determining image correction details in the second image data by comparing the first image data stored in the first image storage with the second image data stored in the second image storage;
an image correction processing portion for executing image correction in the second image data based on the image correction details determined by the image correction determination portion and outputting the corrected image data; and
a background image evaluation portion for evaluating image patterns in the background of the subject to determine whether they are uniform or not,
wherein the image correction processing portion is activated at least when the background image patterns are found to be nearly uniform as a result of the evaluation by the background image evaluation portion.

4. The camera according to claim 3, further comprising:
a warning portion for giving a warning at least when the background image patterns are found to be non-uniform according to the evaluation result of the background image evaluation portion.

5. The camera according to claim 3, further comprising:
a display capable of displaying images in accordance with image data obtained by said image pick-up portion; and
a control portion that, according to the determination of the background image evaluation portion, directs the image correction processing portion to perform the image correction procedure and displays the image in accordance with the corrected image data obtained on the display when the background image patterns are nearly uniform, and prevents the image correction processing portion from performing the image correction procedure and displays the image in accordance with the second image data on the display when the background image patterns are non-uniform.

6. The camera according to claim 3, wherein the contents of the image correction process done by the image correction processing portion includes eliminating a shadow created on the picked up image when the subject is illuminated by illumination light from the strobe apparatus.

7. The camera according to claim 3, further comprising:
a mode change switch for selecting and switching to a desired mode through operations among plural photographic operation modes;
a mode evaluation portion for evaluating whether a predetermined operation mode is selected by the mode change switch; and
a control portion that, according to the evaluation result of the mode evaluation portion, allows the first image storage, the image correction determination portion, and the image correction processing portion to work when a predetermined, operation mode is selected, and prevents the first image storage, image correction determination portion component, and image correction processing portion from working when the predetermined operation mode is not selected.

8. The camera according to claim 3, further comprising:
a control portion that controls the imaging operation such that, when a photography start signal is output, a photograph is taken without light emission onto the subject by the strobe apparatus to provide the first image data of the subject and a photograph is taken with light emission onto the subject by the strobe apparatus to provide the second image data of the subject.

9. A camera comprising:
a strobe apparatus for emitting illumination light onto a subject;
an image pick-up portion for transforming an image of the subject into electric signals and outputting the subject image signals;
a first image storage for storing a first image data of the subject obtained by the image pick-up portion in an image pick up procedure without light emission onto the subject by the strobe apparatus in response to the start of photographing;
a second image storage for storing a second image data of the subject obtained by the image pick-up portion in an image pick up procedure with light emission onto the subject by the strobe apparatus in response to the start of photographing;

an image correction determination portion for determining image correction details in the second image data by comparing the first image data stored in the first image storage with the second image data stored in the second image storage;

an image correction processing portion for executing image correction in the second image data based on the image correction details determined by the image correction determination portion and outputting the corrected image data;

a mode setting portion for selecting and setting a desired mode through operations among plural photographic operation modes including a predetermined operation mode;

a mode evaluation portion for evaluating whether the predetermined operation mode is set or not; and a control portion that, according to the evaluation result of the mode evaluation portion, allows displaying of an image based on the corrected image data provided by the image correction processing portion when the predetermined operation mode is set, and allows displaying of an image based on the second image data when the predetermined operation mode is not set.

10. A camera comprising:

a strobe apparatus for emitting illumination light onto a subject;

an image pick-up portion for transforming an image of the subject into electric signals and outputting the subject image signals;

a first image storage for storing a first image data of the subject obtained by the image pick-up portion in an image pick up procedure without light emission onto the subject by the strobe apparatus in response to the start of photographing;

a second image storage for storing a second image data of the subject obtained by the image pick-up portion in an image pick up procedure with light emission onto the subject by the strobe apparatus in response to the start of photographing;

an image correction determination portion for determining image correction details in the second image data by comparing the first image data stored in the first image storage with the second image data stored in the second image storage;

an image correction processing portion for executing image correction in the second image data based on the image correction details determined by the image correction determination portion and outputting the corrected image data;

a mode setting portion for selecting and setting a desired mode through operations among plural photographic operation modes, including a predetermined operation mode;

a mode evaluation portion for evaluating whether the predetermined operation mode is set or not; and a control portion that, according to the evaluation result of the mode evaluation portion, allows the compression and storage in a memory of the corrected image data provided by the image correction processing portion when the predetermined operation mode is selected, and allows the compression and storage in the memory of the second image data when the predetermined operation mode is not selected.

11. A method for correcting an image data of the subject that is obtained by the image pick-up portion with illumination light emission onto the subject the method comprising:

storing a first image data of the subject that is obtained by the image pick-up portion without light emission onto the subject by the strobe apparatus in response to the start of photography;

storing a second image data of the subject that is obtained by the image pick-up portion with light emission onto the subject by the strobe apparatus in response to the start of photography;

comparing the stored first image data with the stored second image data to determine whether an effect of the shadow created in the second image data by illumination light from the strobe apparatus is larger than a predetermined value;

detecting a range of a shadow created in an image based on the second image data using the stored first image data and the stored second image data;

evaluating image patterns in the background of the subject to determine whether they are uniform or not; and correcting the second image data when the image patterns in the background of the subject are uniform.

12. A camera comprising:

a strobe apparatus for emitting illumination light onto a subject;

an image pick-up portion for transforming an image of the subject into electric signals and outputting the subject image signals;

an image processor for performing an image processing, based on a comparison between first image data and second image data, on the second image data, the first image data being acquired by the image pick-up portion without irradiating light from the strobe apparatus onto the subject, and the second image data being acquired by the image pick-up portion with irradiating light from the strobe apparatus onto the subject;

a background image evaluation portion for evaluation image patterns in the background of the subject to determine whether they are uniform or not; and a control portion for controlling the decision of whether an image processing of the image processor based on the comparison of the first image data and the second image data is performed or not, the decision being made based on the evaluation of the background image evaluation portion of whether the image patterns of the background of the subject are uniform or not.

13. The camera according to claim 12, wherein the image processing of the image processor includes the elimination of the shadow made by the light from the strobe apparatus.

14. The camera according to 12, further comprising a warning portion for giving a warning when the image patterns of the background of the subject is evaluated as non-uniform, based on the evaluation of the background image evaluation portion.

* * * * *